June 20, 1967     A. R. DE LONG     3,326,401

CLOSURE

Filed Oct. 11, 1965

INVENTOR
ALLEN R. DeLONG

BY *Seidel & Gonda*

ATTORNEYS.

United States Patent Office 3,326,401
Patented June 20, 1967

3,326,401
CLOSURE
Allen R. De Long, Vineland, N.J., assignor to Bellco Glass, Inc., Vineland, N.J., a corporation of New Jersey
Filed Oct. 11, 1965, Ser. No. 494,451
3 Claims. (Cl. 215—38)

This invention relates to a closure. More particularly, this invention relates to a closure for containers of aerobic micro-organisms.

In working with micro-organisms, two conflicting conditions must be met. The first is that the micro-organisms or cultures must be grown under sterile conditions. If the micro-organism container or its closure are not sterile, then the culture growing therein will become contaminated and useless. On the other hand, the necessity for maintaining sterile conditions in the teaching, diagnostic, commercial and research laboratory meets head on with the equally vital necessity of providing free access to the atmosphere for the continued existance and propagation of the micro-organisms. Micro-organisms that live only in the presence of oxygen are known as aerobic organisms as compared to anaerobic micro-organisms for which the free access to oxygen is not necessary. Thus, it is necessary to provide a closure for the micro-organism container which is capable of maintaining sterile conditions within the interior of the container by preventing the entrance of contaminating bacteria while at the same time permitting the free access of oxygen or air.

Long ago it was found that cotton wads stuffed in the container opening were effective for accomplishing the dual purposes described above. While such cotton wads serve the general purpose of preventing the contamination of the container while simultaneously permitting the free exchange of oxygen, they suffer from many and serious deficiencies. Many of these deficiencies have been listed and described in United States Patent 2,287,746 which discloses a container closure for use in microbiological work, and in particular, discloses a closure for containers of aerobic bacteria.

Although the closure described in Patent 2,287,746 is extremely effective for most micro-organisms, it is not capable of providing sufficient aeration for work with aerobic organisms where excessive amounts of oxygen uptake are necessary, and where excessive amounts of effluent gas by-products are produced by the organisms. This may be because the closure described in the above-identified patent depends for its effectiveness upon maintaining no more than a slight spatial relationship between its walls and the walls of the container for the free passage of gas. If this spatial relationship is increased to effect an increase in the amount of aeration, the ability of the closure to prevent contamination by unwanted bacteria is decreased or lost.

It therefore is a general object of the present invention to provide a closure for containers of aerobic micro-organisms. The closure of the present invention includes a disposable plug of porous material which is wet heat sterilized by autoclaving for increasing the amount of aeration without destroying the ability of the closure to maintain sterile conditions within the container.

It is another object of the present invention to provide an improved closure for micro-organism containers.

It is still another object of the present invention to provide a closure for micro-organism containers having a disposable plug therein.

It is yet another object of the present invention to provide a closure for micro-organism containers having a disposable porous plug which is wet heat sterilizable.

It is still another object of the present invention to provide a closure for a micro-organism container having an opening in the end wall thereof and a disposable porous plug which is autoclavable overlying said opening.

It is a further object of the present invention to provide a novel metallic closure for a micro-organism container which is provided with at least one opening in an end wall thereof and an open cell porous plug which is disposable and autoclavable overlying said opening.

It is yet another object of the present invention to provide a novel plastic closure for a micro-organism container which is provided with an opening in an end wall thereof and an open cell porous plug which is disposable and autoclavable overlying said opening.

Other objects will appear hereinafter.

For the purpose of illustrating the invention, there are shown in the drawings forms which are presently preferred; it being understood, however, that this invention is not limited to the precise arrangements and instrumentalities shown.

Referring now to the drawings in detail, wherein like numerals indicate like elements, there is shown in FIGURE 1 a closure designated generally as 10.

Figure 1:
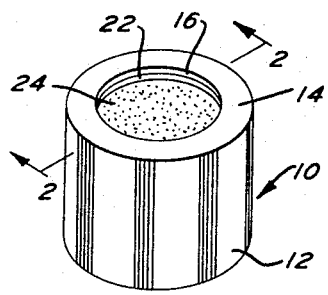
FIGURE 1 is a perspective view of a closure comprising one embodiment of the present invention.

The closure 10 comprises a tubular wall 12 which is preferably cylindrical. The wall 12 is joined to an end wall 14 having an axial opening 16 extending therethrough. The other end of wall 12 is open and adapted to fit over the open end of a micro-organism container 18. The container 18 may be a flask or other known type of container which retains micro-organisms for the purpose of propagating aerobic or anaerobic micro-organisms. The container 18 preferably as made of glass or other material which can readily be sterilized.

The inner periphery of the wall 12 is provided with a helical thread 20 which extends from the end wall 14 to a point intermediate said end wall 14 and the open end of tubular wall 12. In the preferred embodiment, the thread 20 extends between one-quarter and one-third the axial length of of wall 12.

The inner diameter of the wall 12 is slightly larger than the outer diameter of the container opening 18. The tubular wall 12, end wall 14 and thread 20 are preferably integral and made of a rigid permanent plastic which is wet heat sterilizable or autoclavable. By way of example, one such plastic is polypropylene. Polypropylene is a rigid plastic which is capable of withstanding the high temperatures of an autoclave. An autoclave is an air-tight chamber that can be filled with steam under pressure or surrounded by another chamber for the steam and that is used for sterilizing in moist or dry temperatures above 212° F. without boiling.

In the closure 10, the opening 16 is large relative to the diameter of the wall 12. By way of example, the diameter of opening 16 may be approximately three-quarters the diameter of the wall 12.

The closure 10 is provided with a gasket 22 abutting the end wall 14. The gasket 22 provides a more resilient fit between the end wall 14 and the rim of container 18 when the closure 10 is threaded into position. Gasket 22 is made of a material capable of withstanding autoclaving or other types of wet heat sterilization. One such material is silicone rubber. The gasket 22 is held in abutting relation with the end wall 14 by a heat and steam resistant adhesive. By way of example, one such type of adhesive is silicone cement.

A disposable plug 24 is positioned within the closure 10 in abutting relation with the gasket 22. The plug 24 overlies opening 16 and provides a means whereby oxygen may enter the container 18 and effluent gas by-products produced by the organisms escape, while simultaneously preventing contaminating bacteria from entering the container. The plug 24 is preferably disk-shaped, having an outer diameter approximately equal to the inner diameter of tubular wall 12. In general, the peripheral dimension of plug 24 should be such that it completely covers the opening 16, and preferably it is such that the plug may be supported intermediate the gasket 22 and the rim of container 18.

The plug 24 is made from a porous material which is capable of permitting the passage of gas, but will not permit the passage of micro-organic contaminants. The plug is intended to be used only once and then disposed. However, before the plug is used it must be sterilized by a wet heat sterilizing process such as autoclaving. Accordingly, the plug 24 must be wet heat sterilizable, inexpensive enough to be economically disposed of after one use, and capable of preventing contamination of the interior of the container 18. In the preferred embodiment, the plug is made from an open cell porous foam plastic which is wet heat sterilizable by autoclaving. By way of example, the plug 24 may be made from polyethylene, Teflon or foam polyurethane.

Figure 2:
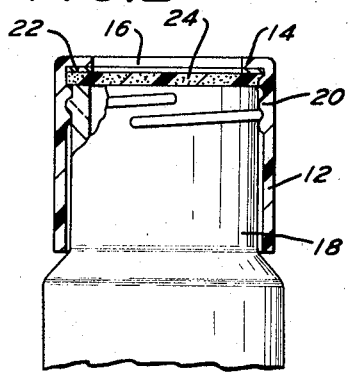
FIGURE 2 is a transverse sectional view of the embodiment shown in FIGURE 1 taken along the line 2—2, and illustrating the closure mounted on a micro-organism container.
Figure 3:
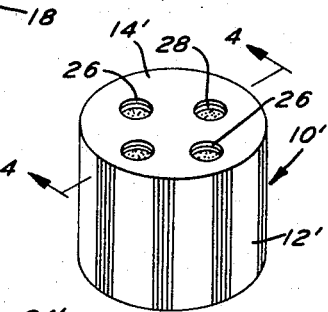
FIGURE 3 is a perspective view of a closure comprising another embodiment of the present invention.
Figure 4:
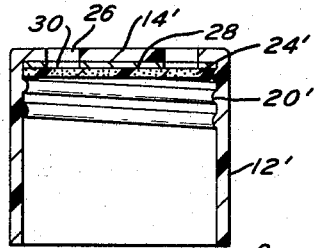
FIGURE 4 is a sectional view of the embodiment shown in FIGURE 3 taken along the line 4—4.

Referring now to FIGURES 3 and 4, there is shown another embodiment of the present invention. The embodiment illustrated in FIGURES 3 and 4 is similar in certain respects to that shown in FIGURES 1 and 2. Accordingly, like elements have been designated with like prime numerals.

As shown, the closure 10' comprises a tubular wall 12' which is cylindrical and integrally joined to an end wall 14'. A helical thread 20' extends along the wall 12' from the end wall 14' to a point approximately one-quarter to one-third the axial length of wall 12'. The thread 20' is adapted to matingly engage threads on a micro-organism container.

The embodiment illustrated in FIGURES 3 and 4 differs from the closure 10 illustrated in FIGURES 1 and 2 in that the end wall is provided with a plurality of spaced-apart openings 26. In the embodiment shown, there are four openings 26. However, it will be readily understood by those skilled in the art that more or less openings may be used depending upon the amount of aeration required.

A gasket 28, preferably made from the same material as the gasket 22 is cemented in abutting relation with the end wall 14'. The gasket 28 and the cement retaining it against end wall 14' are capable of withstanding wet heat sterilization such as autoclaving. As shown, the gasket 28 is provided with a plurality of openings 30 which are aligned with the openings 26 in end wall 14'.

A plug 24' made of the same material and constructed in the same manner as the plug 24 is set in the closure 10' adjacent the gasket 28. Since the plug 24' is the same as the plug 24 and serves the same function, it is not necessary to describe it in further detail. It should be noted, however, that in all instances, the plug 24' overlies the openings 26.

The manner in which the closures 10 and 10' function is as follows: Thus, the plug 24 or 24' is autoclaved and disposed within the wall 12 or 12' adjacent the end wall 14 or 14'. After it has been used once, the plug 24 or 24' may be removed and disposed of. The remainder of the closure 10 or 10' and their respective gaskets are autoclaved or otherwise sterilized and ready for another use with the insertion of a sterilized disposable plug 24'.

In the embodiment shown in FIGURES 1, 2, 3 and 4, the provision of a hole or holes in the end wall, together with a disposable plug overlying the holes and resilient means for retaining the disposable plug adjacent the mouth of the container provides a means whereby sufficient aeration for highly aerobic micro-organisms may be accomplished while at the same time maintaining the necessary sterile conditions within the container.

Figure 5:
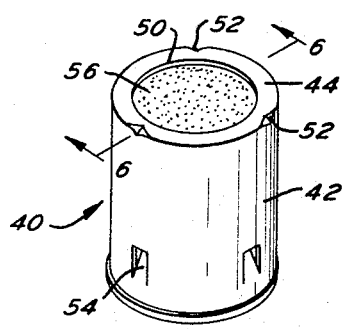
FIGURE 5 is a perspective view of a closure comprising still another embodiment of the present invention.
Figure 7:
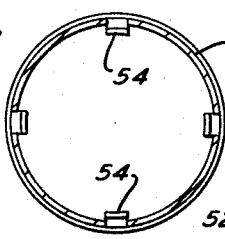
FIGURE 7 is a sectional view of the closure illustrated in FIGURE 6 taken along the line 7—7.
Figure 6:
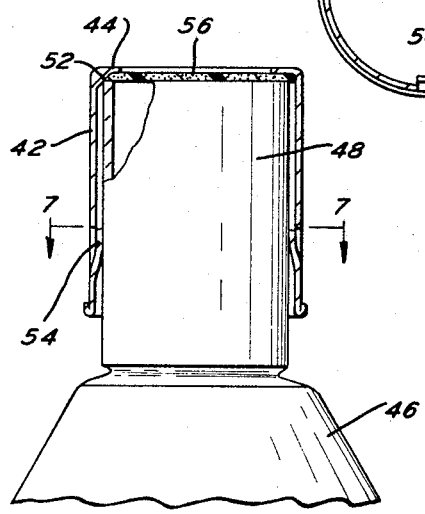
FIGURE 6 is a sectional view of the embodiment illustrated in FIGURE 5 taken along the line 6—6, showing the closure mounted upon a micro-organism container.

Referring now to FIGURES 5, 6 and 7, there is shown yet another embodiment of the present invention designated generally as 40. The closure 40 comprises a tubular wall 42 integrally joined to an end wall 44. The wall 42 is preferably cylindrical and adapted to telescopically slide upon the tubular wall portion 48 of a culture flask 46. The end wall 44 is provided with an opening 50 extending therethrough. As best shown in FIGURE 6, the diameter of cylindrical wall 42 is slightly larger than the outer diameter of tubular flask portion 48. Thus, when the closure 40 is telescopically slid over the portion 48, an open space exists between the wall 48 and wall 42. The wall 42 and end wall 44 are made of stainless steel.

The dimensions of the air space between the wall 42 of metal closure 40 and the wall 48 of flask 46 are such as to prevent the passage of contaminating micro-organisms while at the same time permitting the free passage of oxygen, air or other gases. The provision of an air space such as described above is in accordance with the principles set forth in Patent 2,287,746.

To prevent possible complete closing of the mouth of flask 46, three or more, preferably equally spaced, radially inwardly extending indentations 52 are provided at the junction of end wall 44 and tubular wall 42. As illustrated in FIGURE 7, the indentations 52 rest against the rim of flask 46 to assure that there is always an open space between the flask portion 48 and the closure 40.

Three or more, preferably equally spaced, struck-out resilient fingers 54 are provided in the tubular wall 42. The struck-out fingers are struck out from the wall 42 adjacent the free end thereof. In the embodiment shown, there are four resilient fingers 54 struck out from the wall 42. The fingers 54 are integrally connected to wall 42 and extend inwardly at an angle of approximately 45° to the plane of the wall. As best shown in FIGURE 6, the resilient bias of the fingers 54 engages the wall portion 48 of the flask 46 thereby retaining the closure 40 at a substantially equally spaced distance from the wall portion 48.

The diameter of opening 50 may be varied in accordance with the amount of aeration desired. In the embodiment illustrated, the diameter of opening 50 is approximately three-quarters of the diameter of tubular wall 42.

A porous plug 56 overlies the opening 50. The porous plug performs the same function as the plug 24 illustrated in FIGURE 1. Thus, it permits the free access of air or oxygen to the interior of flask 46 while preventing contaminants from entering therein. The plug 56 is disk-shaped and has a diameter substantially equal to the inner diameter of wall 42. The plug 56 is made from a material which may be wet heat sterilized such as by autoclaving. By way of example, such materials may be a porous foam plastic such as polyethylene, Teflon, or foam polyurethane. Such materials perform the desired function, and yet are inexpensive enough to be disposed of after one use. The plug 56 is interchanged by merely inserting it into the closure 40 and positioning it adjacent the end wall 44.

Figure 8:
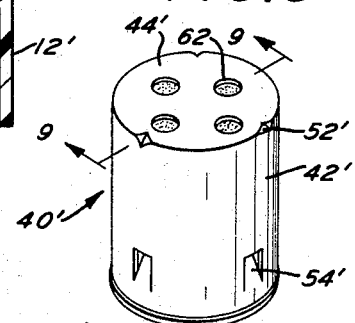
FIGURE 8 is a perspective view of a closure comprising yet another embodiment of the present invention.
Figure 9:
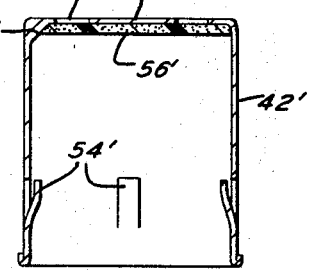
FIGURE 9 is a sectional view of the closure illustrated in FIGURE 8 taken along the line 9—9.

Referring now to FIGURES 8 and 9, there is shown yet another embodiment of the present invention designated generally as 40'. The closure 40' is similar in several respects to the closure 40. Accordingly, like elements have been designated with like primed numbers.

As shown, the closure 40' comprises a tubular metallic wall 42' integrally joined to the end wall 44'. The end wall 44' is provided with a plurality of openings 62 extending therethrough. Resilient fingers 54' are struck out from the wall 42' and serve to maintain it in spaced-apart relationship from the micro-organism container. Similarly, a plurality of indentations 52' are provided in the junction between wall 42' and end wall 44' to assure free access of air to the mouth of the container.

A disposable plug 56' is positioned in overlying relation to the opening 62. The disposable plug 56' is made of a wet heat sterilizable material such as the open cell porous foam plastic set forth above. The plug 56 is disk-shaped and retained within the closure 40' by merely abutting it against wall 44' by means of the rim of the container.

It should be noted that each of the embodiments described above has been provided with a porous plug overlying an opening in the end wall thereof. The effect of the plug and holes is to provide sufficient aeration for highly aerobic micro-organisms such as penicillin. The porous plug is removable from the closure and therefore may be disposed of after each use. Moreover, it is autoclavable or otherwise wet heat sterilizable. The disposable plugs are quickly and simply inserted and removed from the closures and may be manufactured in uniform peripheral dimensions and thicknesses. The plugs can be easily sterilized and contain no fouling contaminants or lint. Since the plugs are not inserted directly into the mouth of the containers, they are not as likely to become soiled with the contents.

The present invention may be embodied in other specific forms without departing from the spirit or essential attributes thereof and, accordingly, reference should be made to the appended claims, rather than to the foregoing specification as indicating the scope of the invention.

I claim:
1. A closure for a micro-organism container comprising an end wall and a tubular side wall, said end wall and said side wall having substantially the same wall thickness, circumferentially spaced resilient fingers joined to said side wall and projecting inwardly, at least one opening through said end wall, and a disposable plug made of a porous material which is wet heat sterilizable by autoclaving within said tubular wall overlying said opening.

2. A closure in accordance with claim 1 wherein said end wall has a plurality of openings therethrough.

3. A metallic closure for a micro-organism container wherein said container includes a neck portion having a smooth outer periphery comprising an end wall and a tubular side wall, the inner peripheral dimensions of said tubular side wall being slightly larger than the peripheral dimensions of the portion of the container defining its opening, circumferentially spaced fingers joined to said side wall and projecting inwardly for frictional engagement with the outer surface of the neck of the container, indentations in said tubular side wall and said end wall for preventing complete closure of the container, an opening through said end wall, and a disposable plug made of an open cell porous material which is wet heat sterilizable within said tubular end wall and overlying said opening.

References Cited
UNITED STATES PATENTS

| | | |
|---|---|---|
| 986,135 | 3/1911 | Campbell. |
| 2,102,158 | 12/1937 | Keaney et al. _____ 215—56 |
| 2,241,022 | 5/1941 | Sierad et al. |
| 2,287,746 | 6/1942 | Morton _____ 215—38 |
| 2,672,431 | 3/1954 | Goetz. |
| 2,732,092 | 1/1956 | Lawrence. |
| 3,072,285 | 1/1963 | Aileo. |
| 3,134,725 | 5/1964 | Brook et al. |

JOSEPH R. LECLAIR, *Primary Examiner.*

D. F. NORTON, *Assistant Examiner.*